United States Patent [19]

Matsui et al.

[11] Patent Number: 4,996,550
[45] Date of Patent: Feb. 26, 1991

[54] SHUTTER SPEED CONTROL DEVICE

[75] Inventors: Hideki Matsui, Yokohama; Nobuyoshi Hagiuda, Kawasaki; Norikazu Yokonuma, Tokyo; Hiroshi Sakamoto, Kawasaki; Yoshikazu Iida, Chigasaki, all of Japan

[73] Assignee: Nikon Corporation, Tokyo, Japan

[21] Appl. No.: 332,179

[22] Filed: Apr. 3, 1989

[30] Foreign Application Priority Data

Apr. 8, 1988 [JP] Japan ............................ 63-86387

[51] Int. Cl.$^5$ .................. G03B 7/00; G03B 15/03
[52] U.S. Cl. ...................... 354/420; 354/435; 354/137
[58] Field of Search .......... 354/420, 413, 137, 129, 354/435, 456, 195.1

[56] References Cited

U.S. PATENT DOCUMENTS 4,479,704 10/1984 Masunaga ..................... 354/137

*Primary Examiner*—L. T. Hix
*Assistant Examiner*—Cassandra C. Spyrou
*Attorney, Agent, or Firm*—Shapiro and Shapiro

[57] ABSTRACT

In a camera system comprising a camera and a flash device, a first synchronizing signal is generated when the camera shutter starts an exposure, and a second synchronizing signal is generated when the exposure is about to be terminated. First and second synchro control modes may be selected. A light emission control is responsive to the first synchronizing signal to drive the flash device when the first synchro control mode is selected and is responsive to the second synchronizing signal to drive the flash device when the second synchro control mode is selected. A shutter control makes possible the driving of the shutter at shutter speeds up to a first limit speed when the first synchro control mode is selected and makes possible the driving of the shutter at shutter speeds up to a second limit speed when the second synchro control is selected, the second limit speed being lower than the first limit speed.

7 Claims, 1 Drawing Sheet

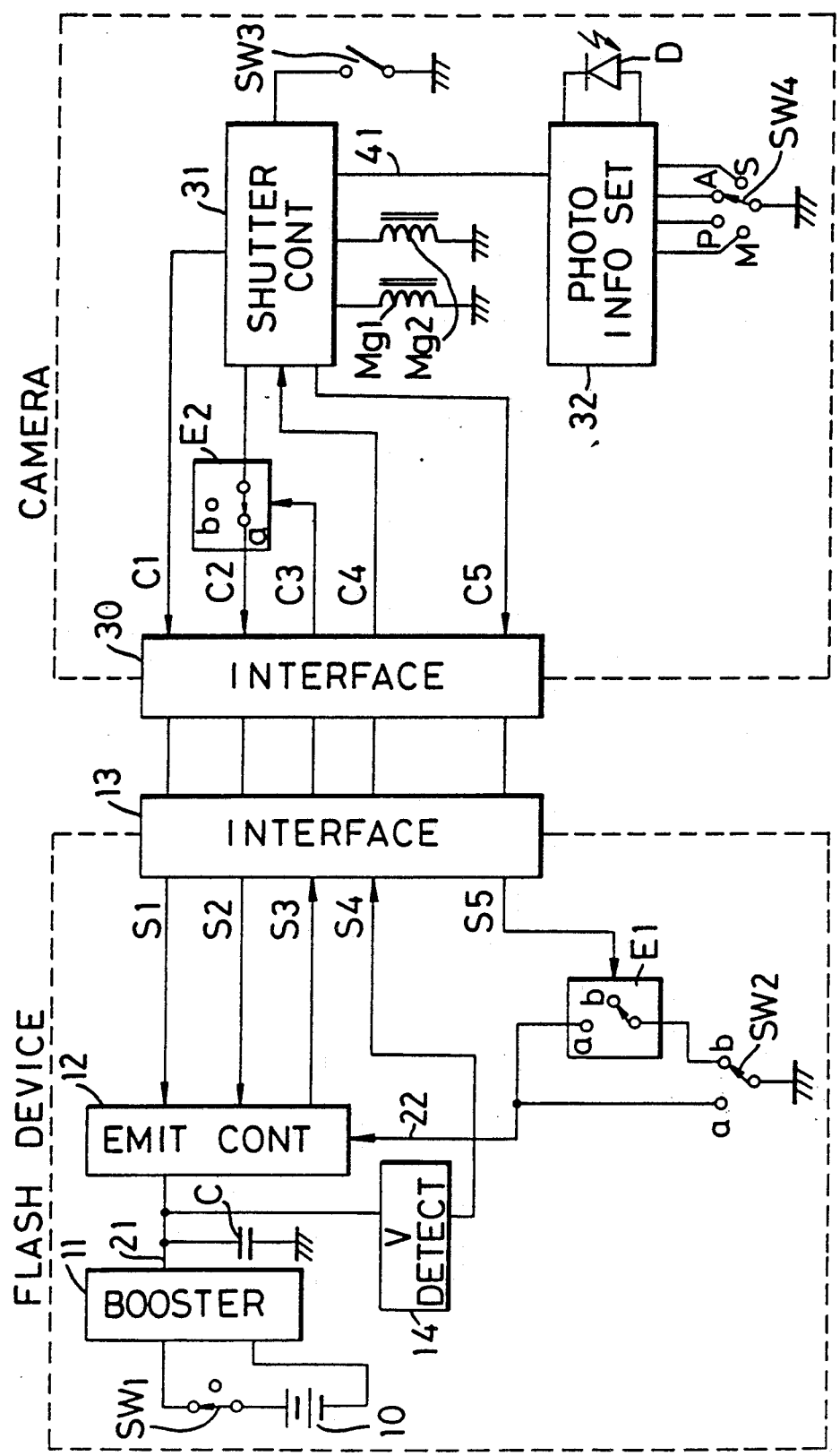

SHUTTER SPEED CONTROL DEVICE

BACKGROUND OF THE INVENTION

1. Field of the Invention

This invention relates to the shutter speed control of a camera, and in particular to a device for synchronously controlling the exposure time of a film and the light emission of an electronic flash device.

2. Related Background Art

When flash photography is to be effected with a camera having a focal plane shutter and an electronic flash device combined together, the shutter speed of the camera must coincide with a maximum speed synchronizable to the light emission of the flash device (synchro speed) or must be set to a speed lower than that. So, a camera provided with a shutter control device for forcibly changing over the shutter speed set on the camera side to the synchro speed or lower when said shutter speed is higher than the synchro speed, at a point of time whereat an electronic flash device is mounted on the camera and a power source switch is closed or the charging of the main capacitor of the electronic flash device is completed, is well known.

As the synchro device of a focal plane shutter camera, there are aperture opening blade synchro control in which the electronic flash device is caused to emit light in synchronism with the completion of the movement of the aperture opening blades of the shutter, and aperture closing blade synchro control in which the electronic flash device is caused to emit light in synchronism with the start of the movement of the aperture closing blades of the shutter.

In the aperture opening blade synchro control, a main object is illuminated at the first moment of the exposure of a film and therefore, when an object fast in movement is flash-photographed at a relatively low shutter speed, a flow of image occurs forwardly of the object, and this leads to the disadvantage that an unnatural photograph is taken. In contrast, in the aperture closing blade synchro control, the main object is illuminated at the last moment of the exposure of the film and therefore, effective photographing becomes possible. There is also a camera provided with aperture opening blade synchro control and aperture closing blade synchro control and capable of selectively them over.

A camera provided with a plurality of different modes with respect to exposure control is also known. A camera is also known in which the shutter speed is automatically controlled so as not to be lower than a predetermined shutter speed (e.g. 1/60 sec.) in order to prevent an unsatisfactory photograph from being taken due to camera shake when a programmed automatic exposure control mode (a combination of the shutter speed and the aperture value being automatically set in conformity with the luminance of an object) or an aperture priority automatic exposure control mode is selected as the photographing mode.

However, if in flash photography, only shutter speeds always higher than 1/60 sec. are obtained, it will limit the intention of the operator who intends to obtain effective photographs. Particularly, even if the operator wants to compose the after image of a moving object in a photograph by the aperture closing blade synchro control, the operator cannot display a sufficient effect. Therefore, the operator must change over the photographing mode of the camera, for example, to a shutter priority automatic exposure control mode or a manual mode (the shutter speed and the aperture in use being manually set) each time.

SUMMARY OF THE INVENTION

The present invention has as an object to provide in an electronic flash device an automatic shutter speed control device which can more precisely reflect the operator's photographing intention.

The camera of the present invention can selectively change over the aperture opening blade synchro control and the aperture closing blade synchro control, and during the aperture closing blade synchro control, it inhibits the automatic control at a shutter speed lower than a predetermined shutter speed (i.e., a shutter speed for which the exposure time is longer), with the intention of preventing camera shake photographing, and during the aperture closing blade synchro control, it permits a shutter speed lower than the predetermined shutter speed.

The camera of the present invention is designed such that when the photographing mode of the camera is selected to the programmed automatic exposure control mode or the aperture priority automatic exposure control mode in which the shutter speed is automatically set on the camera side, it permits a lower shutter speed during the aperture closing blade synchro control, thereby enabling a photograph in which slow synchro photographing appears effectively to be taken even in the photographing of a dynamic object.

BRIEF DESCRIPTION OF THE DRAWING

The figure of the accompanying drawing shows in block diagram a combination of an electronic flash device and a camera according to an embodiment of the present invention.

DESCRIPTION OF THE PREFERRED EMBODIMENT

Referring to the figure of the drawing which shows a flash photographing system having a camera and an electronic flash device, a power source 10 is connected to a well-known booster circuit 11 through a switch SW1. Also, a high voltage is connected from the booster circuit 11 to an emit control circuit 12 through a line 21. A main capacitor C is connected to the line 21. The emit control circuit 12 includes all elements and circuits necessary for the output control of the electronic flash device, such as a flash discharge tube, a photometering circuit, a trigger circuit and a light emission stopping circuit. A mode selecting switch SW2 is connected to a terminal a for the selection of the aperture opening blade synchro control of the shutter (the control for causing the electronic flash device to emit light in response to the termination of the movement of the aperture opening blades of the focal plane shutter), and is connected to a terminal b for the selection of the aperture closing blade synchro control (the control for causing the electronic flash device to emit light in synchronism with the start of the movement of the aperture closing blades of the focal plane shutter). An electronic switch E1 is normally connected to a terminal a, and is connected to a terminal b when a signal to be described is output to a line S5.

A voltage detecting circuit 14 connected to the line 21 detects the charging voltage of the main capacitor C, and outputs a charging completion signal to a signal line $4 at a point of time whereat charging is completed. At the same time, this circuit 14 also outputs to the signal line S4 a flash photography possibility signal indicative of the fact that flash photography using the electronic flash device is possible. An aperture opening blade synchro signal output from the camera in synchronism with the completion of the movement of the aperture opening blades of the shutter is input to a line S1, and an aperture closing blade synchro signal output from the camera in synchronism with the start of the movement of the aperture closing blades of the shutter is input to a line S2. Also, the emit control circuit 12 generates a signal representative of the fact that the aperture closing blade synchro control has been established in a line S3 when a signal line 22 is at H level.

The lines S1–S5 correspond to the lines C1–C5, respectively, of the camera connected to the interface 30 of the camera through an interface 13.

On the other hand, on electronic switch E2 is normally connected to a terminal b, and is changed over to a terminal a in response to a signal input through the lines S3 and C3 when the electronic flash device is set to the aperture closing blade synchro control.

A shutter control circuit 31 has a microcomputer, and outputs a light emission signal for determining the shutter speed or causing the electronic flash device to emit light on the basis of various photographing modes and information such as film speed. A release switch SW3 is closed in response to the depressing operation of a release button, not shown. A magnet Mg1 releases the restraint of the aperture opening blades of the focal plane shutter and causes the exposure of the film to be started, and a magnet Mg2 releases the restraint of the aperture closing blades and causes the exposure of the film to be terminated.

In the present embodiment, the magnets Mg1 and Mg2 are electrically energized prior to the release operation, and are electrically deenergized when the release switch is closed, whereby the aperture opening blades and aperture closing blades of the shutter are moved.

The shutter control circuit 31 outputs an aperture opening blade synchro signal to the line C1 in synchronism with the closing of the release switch SW3, outputs an aperture closing blade synchro signal to the line C2 during the aperture closing blade synchro photographing mode, receives as inputs from the line C4 the flash photography possibility signal and charging completion signal from the electronic flash device, and outputs to the line C5 a signal for transmitting to the electronic flash device the effect that the camera is a camera of the type in which aperture closing blade synchro control is possible.

Further, the shutter control circuit 31 is connected to a photographing information setting circuit 32 through a line 41. A photodiode D for measuring the steady light level (hereinafter referred to as the luminance level) of an object and a photographing mode change-over switch SW4 are connected to the photographing information setting circuit 32.

The camera of the present embodiment has four photographing modes. The manual mode (the mode M) is a mode in which the photographer arbitrarily sets the shutter speed of the camera and the aperture value of the photo-taking lens. The program mode (the mode P) is a mode in which in accordance with a program curve preset by the camera, the combination of the shutter speed and the aperture value is automatically determined on the basis of the luminance level of the object and the type of the photo-taking lens. The aperture priority mode (the mode A) is a mode in which a shutter speed for obtaining proper exposure for the aperture value set by the photographer is automatically determined in conformity with the luminance level of the object. The shutter priority mode (the mode S) is a mode in which an aperture value for obtaining proper exposure for the shutter speed set by the photographer is automatically determined in conformity with the luminance level of the object. Selection of Aperture Opening Blade Synchro Control When the change-over switch SW2 of the electronic flash device is changed over to the "a" side, line 22 assumes L level and the emit control circuit 12 inhibits the input to the line, S2 by the internal logic thereof. When the main capacitor C is charged by the closing of the power source switch SW1, the flash photography possibility signal and charging completion signal are output from the voltage detecting circuit 14 to the shutter control circuit 31 of the camera through the line S4 and the line C4. In response to these signals, the shutter control circuit 31 changes the shutter speed to the synchro speed or less to thereby make flash photography possible when the shutter speed preset by the camera is higher than the synchro speed (e.g. 1/250 sec.)

For example, if the mode A is selected by the photographying mode change-over switch SW4 and a signal is input from the line C4 when the shutter speed determined by the shutter control circuit on the basis of the luminance level of the object is 1/1000 sec., the shutter control circuit 31 changes the shutter speed to 1/250 sec. When the release switch SW3 is closed, the shutter control circuit 31 stops the supply of electric power to the aperture opening blade magnet Mg1 and starts the movement of the aperture opening blades. At a point of time whereat the movement of the aperture opening blades has been terminated it outputs a signal to the line C1. The emit control circuit 12 of the electronic flash device receives this signal through the line S1 and enters the light emitting operation of the flash discharge tube.

When in the similar mode A, the shutter speed determined on the luminance level of the object is e.g. 1/15 sec., if a signal is input from the line C4, the shutter control circuit 31 changes the shutter speed to a relatively high shutter speed (1/60 sec.) of the degree which will not forcibly cause camera shake. Accordingly, the low speed limit (the first limit speed) of the shutter speed when the mode P or the mode A is selected in the aperture opening blade synchro control is 1/60 sec. Selection of Aperture Closing Blade Synchro Control When the change over switch SW2 of the electronic flash device is changed over to the "b" side, the common terminal of the electronic switch E1 is grounded. When a signal indicative of the fact that the camera is a camera of the type in which aperture closing blade synchro control is possible is input from the shutter control circuit 31 of the camera through the line S5, the electronic switch E1 is set to the "b" side. In the present embodiment, even if the aperture closing blade synchro control is selected on the electronic flash device side, where the camera is of the type in which the aperture closing blade synchro control is not possible, the signal line 22 assumes L level and aperture closing blade synchro is not effected.

When the aperture closing blade synchro control is set, the emit control circuit 12 makes the inputting of the signal of the line S2 possible and does not respond to the signal of the line S1. Accordingly, the flash discharge tube emits light at a point of time whereat it receives the aperture closing blade synchro signal of the line S2.

When the signal line 22 is maintained at H level, the electronic switch E2 is changed over to the terminal a side by the signal output from the emit control circuit 12 to the lines S3 and C3, and the aperture closing blade synchro signal from the shutter control circuit 31 becomes transmissible to the emit control circuit through the lines C2 and S2. When the release switch SW3 is closed, the supply of electric power to the aperture opening blade magnet Mg1 is stopped and the aperture opening blades start to move. Immediately after the termination of the movement of the aperture opening blades, an aperture opening blade synchro signal is output from the shutter control circuit 31 to the line C1, but as previously described, the flash emission at this point of time is not effected. When in a predetermined time thereafter, the supply of electric power to the aperture closing blade magnet Mg2 is stopped and the aperture closing blades start to move, an aperture closing blade synchro signal is output to the line C2 in synchronism therewith. When the shutter speed determined on the basis of the luminance level of the object is e.g. 1/1000 sec., the shutter control circuit 31 changes the shutter speed to the synchro speed 1/250 sec. in response to the signal from the line C4 and makes flash photography possible. Also, when the shutter speed determined on the basis of the luminance level is 1/15 sec., that is, although the shutter speed is a low shutter speed which may cause camera shake, the shutter control circuit 31 executes shutter control at this determined shutter speed 1/15 sec.

The above-mentioned aperture closing blade synchro signal is transmitted to the emit control circuit 12 through the line S2 and at that point of time, light emission is started. Thus, again in the aperture closing blade synchro control, the shutter control circuit 31 changes the shutter speed depending on the presence or absence of emitted flash light, but the manner of changing the shutter speed differs from that during the aperture opening blade synchro control and the limit on the low speed shutter side is permitted up to a second limit speed lower than 1/60 sec. The second limit speed in the present embodiment is e.g. 30 sec. Thereby, in a case where a moving object is photographed under the aperture closing blade synchro control, there can be obtained a photograph having a flow of image rearwardly of the main object. This effect is not seen when the shutter speed is high, but can be displayed more as the shutter speed becomes lower.

Although the photographing mode of the camera has been described above with respect to the case of the mode A, what has been described above also holds true of the mode P.

In the above-described embodiment, the switch SW2 for changing over the aperture opening blade synchro control and the aperture closing blade synchro control is provided on the electronic flash device side, but said switch SW2 may be provided for example, on the camera body side.

Also, in the above-described embodiment, an example of the camera having a focal plane shutter has been shown, but no inconvenience will be encountered even if the present invention is applied to a camera having a lens shutter.

We claim:

1. A camera system capable of flash photography, comprising:
   shutter means for opening and closing an exposure opening to thereby start and terminate the exposure of a film;
   means for generating a synchronizing signal for triggering light emission for said flash photography, said generating means having a first synchro control mode in which said synchronizing signal is generated when said exposure is started, and a second synchro control mode in which said synchronizing signal is generated when said exposure has begun termination;
   means for arbitrarily selecting a control mode from said first synchro control mode and said second synchro control mode; and
   shutter control means for making possible the driving of said shutter means at shutter speeds up to a first limit speed as long as said first synchro control mode is selected, and making possible the driving of said shutter means at shutter speeds up to a second limit speed as long as said second synchro control mode is selected, said second limit speed being lower than said first limit speed.

2. A camera system according to claim 1, wherein said shutter control means includes means for providing information regarding the luminance of an object, and means for determining said shutter speeds on the basis of said luminance information.

3. A camera system according to claim 2, wherein said determining means determines said shutter speeds to said first limit speed when a shutter speed for obtaining a proper exposure amount for said object is lower than said first limit speed as long as said first synchro control mode is selected, and determines said shutter speeds to said second limit speed when the shutter speed for obtaining a proper exposure amount for said object is lower than said second limit speed as long as said second synchro control mode is selected.

4. A camera system according to claim 2, wherein said determining means determines said shutter speeds to a shutter speed for obtaining a proper exposure amount for said object between said first limit speed and a predetermined synchro speed synchronizable to the light emission as long as said first synchro control mode is selected, and determines said shutter speeds to a shutter speed for obtaining a proper exposure amount for said object between said second limit speed and said synchro speed as long as said second synchro control mode is selected.

5. A camera system capable of flash photography, comprising:
   shutter means for opening and closing an exposure opening to thereby start and terminate the exposure of a film;
   means for generating a synchronizing signal for triggering light emission for said flash photography, said generating means having a first synchro control mode in which said synchronizing signal is generated when said exposure is started, and a second synchro control mode in which said synchronizing signal is generated when said exposure has begun termination;
   means for arbitrarily selecting a control mode from said first synchro control mode and said second synchro control mode; and
   shutter control means for driving said shutter means so that as long as said second synchro control mode is selected a longer exposure time is provided than when said first synchro control mode is selected with respect to the same object.

6. A camera system according to claim 5, wherein said shutter control means includes means for providing information regarding the luminance of the object, and means for determining said exposure time on the basis of said luminance information.

7. A camera system according to claim 6, wherein said exposure time determining means determines, on the basis of said luminance information, an exposure time for obtaining a proper exposure amount for said object.

* * * * *